Patented Mar. 9, 1954

2,671,788

UNITED STATES PATENT OFFICE 2,671,788

NEW PYRIMIDINE DERIVATIVES

Robert Michel Jacob, Ablon-sur-Seine, and Léonide Liakhoff, Vitry-sur-Seine, France, assignors to Societe des Usines Chimiques Rhone-Poulenc, Paris, France, a French body corporate No Drawing. Application December 4, 1952, Serial No. 324,142

7 Claims. (Cl. 260—256.4)

This invention relates to new organic compounds and has for its principal object to provide new pyrimidine derivatives of value in human and veterinary therapy, particularly as amoebicides.

According to the present invention pyrimidine derivatives of value in human and veterinary therapy, particularly as amoebicides, are bases of the general formula:

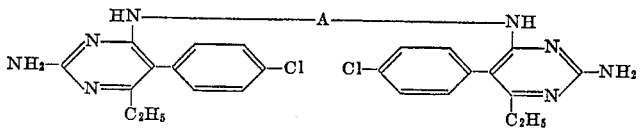

and salts of such bases, where A is a divalent aliphatic chain containing from 2 to 6 carbon atoms.

Compounds of the foregoing formula may be obtained, in accordance with a feature of this invention, by condensing a member of the class consisting of 2-amino-4-chloro-5(4'-chlorophenyl)-6-ethylpyrimidine and its N-acetylated derivative with a diamine having the general formula $NH_2$—A—$NH_2$. The condensation is preferably carried out by condensing two molecular proportions of the pyrimidine reactant with one molecular proportion of the diamine reactant in the presence of a boiling solvent such as boiling phenol.

2-amino-4-chloro-5(4'- chlorophenyl) -6-ethylpyrimidine, used as starting material, may conveniently be produced by a process as described in our co-pending application Serial No. 294,485 dated June 19, 1952. The 2-acetylamino derivative is readily prepared therefrom by standard acetylation methods. Suitable amines for use having the formula $NH_2$—A—$NH_2$ include straight chain α,ω-alkylene diamines having from 2 to 6 carbon atoms in the molecule such as ethylene diamine, 1:4-diamino-butane and hexamethylene diamine.

Without particular difficulty, compounds are thus obtained which conform to the general formula already referred to and which may if desired be converted into their salts by the usual methods for converting organic bases into their salts.

The aforesaid compounds have valuable amoebicidal properties and may be used in human and veterinary medicine.

The following examples will serve to illustrate the invention:

Example I 13.4 g. of 2-amino-4-chloro-5(p-chlorophenyl)-6-ethylpyrimidine of M. P. 163° C., 1.58 g. of ethylene diamine of 95% purity and 30 g. of phenol are heated under reflux for 1 hour. The resulting solution is poured into a dilute aqueous solution of caustic soda. The product which separates is filtered off, washed with water and dried. There is thus obtained 14 g. of a crude product of M. P. 229-230° C. After conversion into dihydrochloride, recrystallisation of the dihydrochloride from water and conversion back to the base, the product is N,N' - 1:2-di(2'-amino-5'-p-chlorophenyl - 6' - ethyl-4'-pyrimidyl) amino-ethane of M. P. 352-353° C.

Example II

Operating as in Example I but using 5.9 g. of 2-amino - 4 - chloro-5-(p-chlorophenyl)-6-ethylpyrimidine, 1.1 g. of 1:4-diamino-butane of 95% purity and 30 g. of phenol there is obtained 6.5 g. of crude N,N'-1:4-di(2'-amino-5'-p-chlorophenyl - 6' - ethyl - 4' - pyrimidyl) amino-butane. This is purified by recrystallisation of its dihydrochloride from methanol and conversion back to the base of M. P. 226° C.

Example III

Operating as in Example I but using 6.7 g. of 2-amino - 4 - chloro-5-(p-chlorophenyl)-6-ethylpyrimidine, 1.5 g. of hexamethylene diamine of 96% purity and 15 g. of phenol there is obtained 7.7 g. of crude N,N'-1:6-di(2'-amino-5'-p-chlorophenyl-6'-ethyl-4'-pyrimidyl) amino - hexane of M. P. 185° C. which, after recrystallisation from boiling alcohol, melts at 195° C. and melts again at 215-216° C. after resolidifying.

We claim:

1. New pyrimidine derivatives of value in human and veterinary therapy, particularly as amoebicides, selected from the class consisting of bases of the general formula:

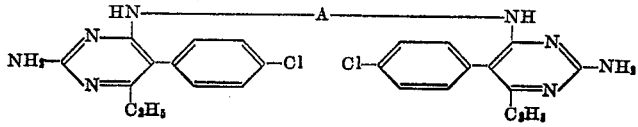

and the non toxic acid salts of such bases, where A is a lower alkylene radical containing from 2 to 6 carbon atoms.

2. N,N'-1:2-di(2'-amino-5'-p-chlorophenyl-6'-ethyl-4'-pyrimidyl)-amino-ethane.

3. N,N'-1:4-di(2'-amino-5'-p-chlorophenyl-6'-ethyl-4'-pyrimidyl)-amino-butane.

4. N,N'-1:6-di(2'-amino-5'-p-chlorophenyl-6'-ethyl-4'-pyrimidyl)-amino-hexane.

5. Process for the production of new pyrimidine derivatives of value in human and veterinary therapy, particularly as amoebicides, selected from the class consisting of bases of the general formula:

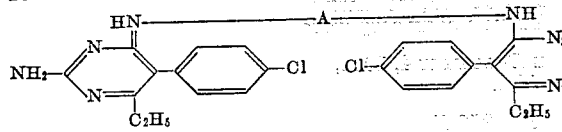

and non toxic acid salts of such bases, where A is a lower alkylene radical containing from 2 to 6 carbon atoms, which process comprises condensing a member of the class consisting of 2-amino-4-chloro-5(4'-chlorophenyl)-6-ethyl-pyrimidine and its N-acetylamino derivative with a diamine having the formula $NH_2$—A—$NH_2$.

6. Process for the production of new pyrimidine derivatives of value in human and veterinary therapy, particularly as amoebicides, which process comprises condensing a member of the class consisting of 2-amino-4-chloro-5(4'-chlorophenyl)-6-ethylpyrimidine and its N-acetylamino derivative with a straight chain $\alpha,\omega$-alkylene diamine containing from 2 to 6 carbon atoms.

7. Process according to claim 6 which comprises condensing two molecular proportions of the pyrimidine reactant with one molecular proportion of the diamine reactant in the presence of a boiling solvent.

ROBERT MICHEL JACOB.
LÉONIDE LIAKHOFF.

No references cited.